(12) United States Patent
Tracht

(10) Patent No.: US 7,325,825 B2
(45) Date of Patent: Feb. 5, 2008

(54) VEHICLE SEAT ASSEMBLY WITH AIR BAG GUIDE

(75) Inventor: Michael L. Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 166 days.

(21) Appl. No.: 10/904,852

(22) Filed: Dec. 1, 2004

(65) Prior Publication Data

US 2006/0113767 A1   Jun. 1, 2006

(51) Int. Cl.
  *B60R 21/207* (2006.01)
(52) U.S. Cl. .................................. 280/730.2
(58) Field of Classification Search .............. 280/730.2
  See application file for complete search history.

(56) References Cited

U.S. PATENT DOCUMENTS

| | | | |
|---|---|---|---|
| 5,498,030 A | 3/1996 | Hill et al. | |
| 5,645,295 A | 7/1997 | White, Jr. et al. | |
| 5,678,853 A | 10/1997 | Maly | |
| 5,749,597 A | 5/1998 | Saderholm | |
| 5,762,363 A | 6/1998 | Brown et al. | |
| 5,810,389 A * | 9/1998 | Yamaji et al. | 280/730.2 |
| 5,816,610 A * | 10/1998 | Higashiura et al. | 280/728.3 |
| 5,860,673 A | 1/1999 | Hasegawa et al. | |
| 5,863,063 A | 1/1999 | Harrell | |
| 5,899,528 A | 5/1999 | Rumpf et al. | |
| 5,927,749 A | 7/1999 | Homier et al. | |
| 5,938,232 A | 8/1999 | Kalandek et al. | |
| 5,967,603 A | 10/1999 | Genders et al. | |
| 6,045,151 A | 4/2000 | Wu | |
| 6,050,636 A | 4/2000 | Chevallier et al. | |
| 6,206,410 B1 | 3/2001 | Brown | |
| 6,237,934 B1 | 5/2001 | Harrell et al. | |
| 6,352,304 B1 | 3/2002 | Sorgenfrei | |
| 6,588,838 B1 | 7/2003 | Dick, Jr. et al. | |
| 7,134,685 B2 | 11/2006 | Panagos et al. | |
| 2006/0113752 A1 | 6/2006 | Tracht | |
| 2006/0113761 A1 | 6/2006 | Tract | |

(Continued)

FOREIGN PATENT DOCUMENTS

DE   10307480   9/2004

(Continued)

OTHER PUBLICATIONS

U.S. Appl. No. 08/808,572, filed Feb. 28, 1997, Wu et al.

(Continued)

*Primary Examiner*—Paul N. Dickson
*Assistant Examiner*—Joselynn Y. Sliteris
(74) *Attorney, Agent, or Firm*—Brooks Kushman P.C.

(57) ABSTRACT

A vehicle seat assembly includes an air bag arrangement having an inflatable air bag, and a guide disposed proximate the air bag arrangement for facilitating deployment of the air bag. The assembly further includes a seat cushion attached to the guide, and a cover material overlaying the seat cushion, the guide and the air bag arrangement, wherein the cover material includes first and second sections. A retainer is connected to the guide and the first and second sections of the cover material. Upon inflation of the air bag, portions of each of the guide and the retainer are configured to move away from each other to allow the air bag to deploy between the first and second sections of the cover material.

20 Claims, 4 Drawing Sheets

U.S. PATENT DOCUMENTS

2006/0113768 A1    6/2006   Tracht
2006/0113769 A1    6/2006   Tracht

FOREIGN PATENT DOCUMENTS

| | | | |
|---|---|---|---|
| DE | 10340508 A1 | * | 3/2005 |
| EP | 0819587 A1 | * | 1/1998 |
| FR | 2 806 685 A1 | | 9/2001 |

OTHER PUBLICATIONS

Notice of Allowance, mailed Jun. 6, 2007 for Serial No. 10/904,854, filed Dec. 2004, Inventor: Michael L. Tracht, Attorney Docket No. LEAR 05256 PUS, Publication No. 2006/0113769A1.

* cited by examiner

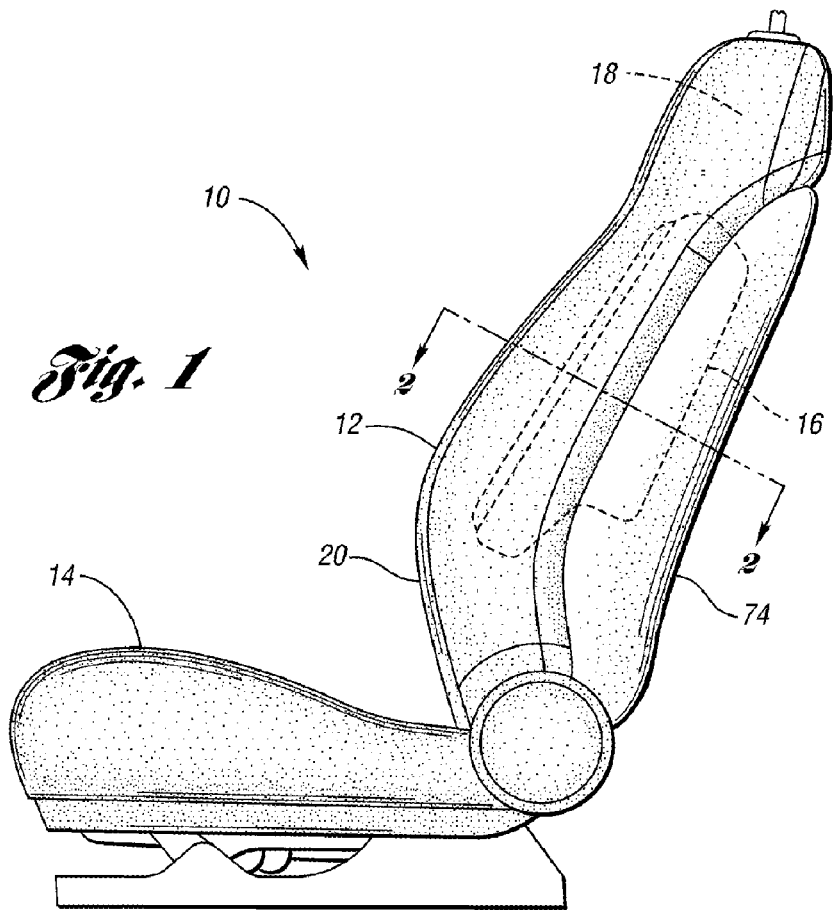
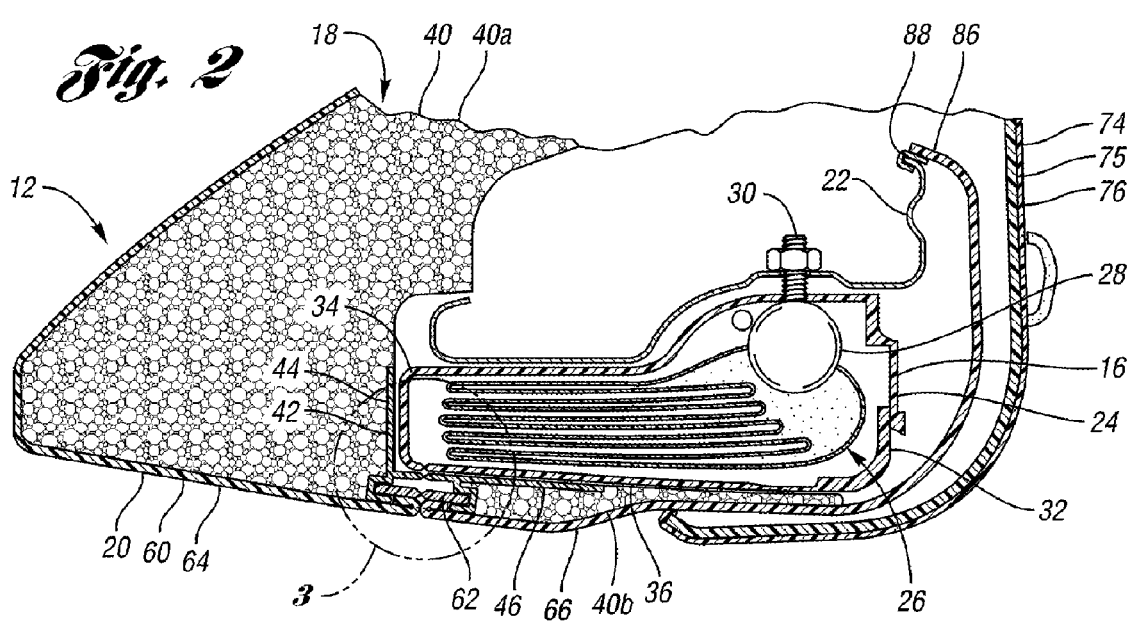

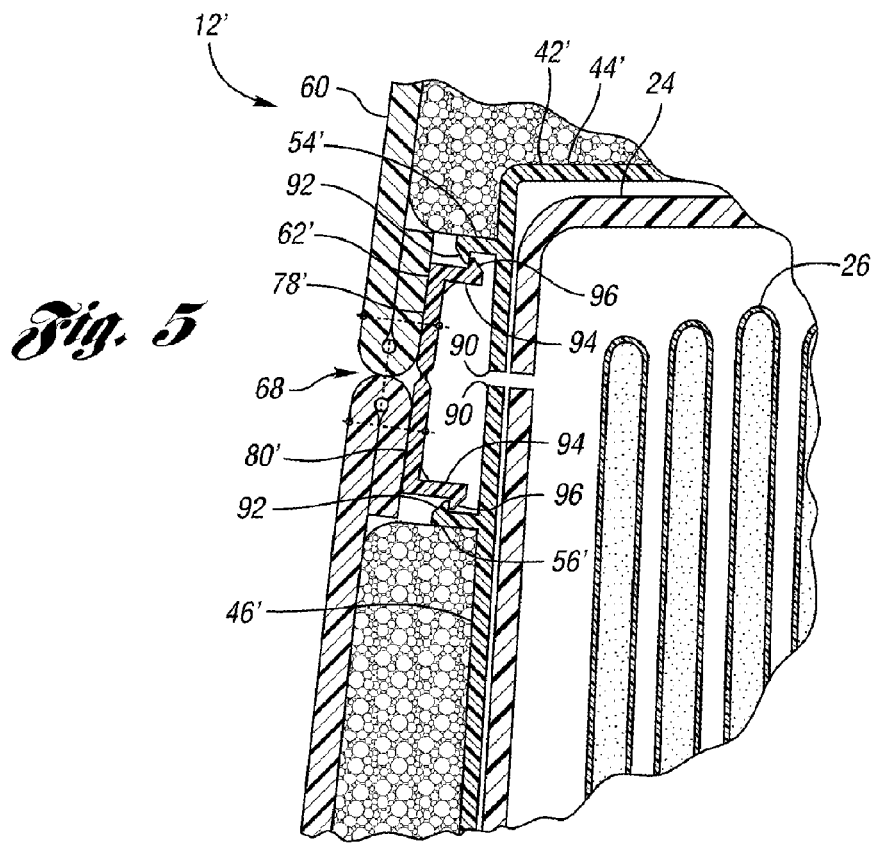
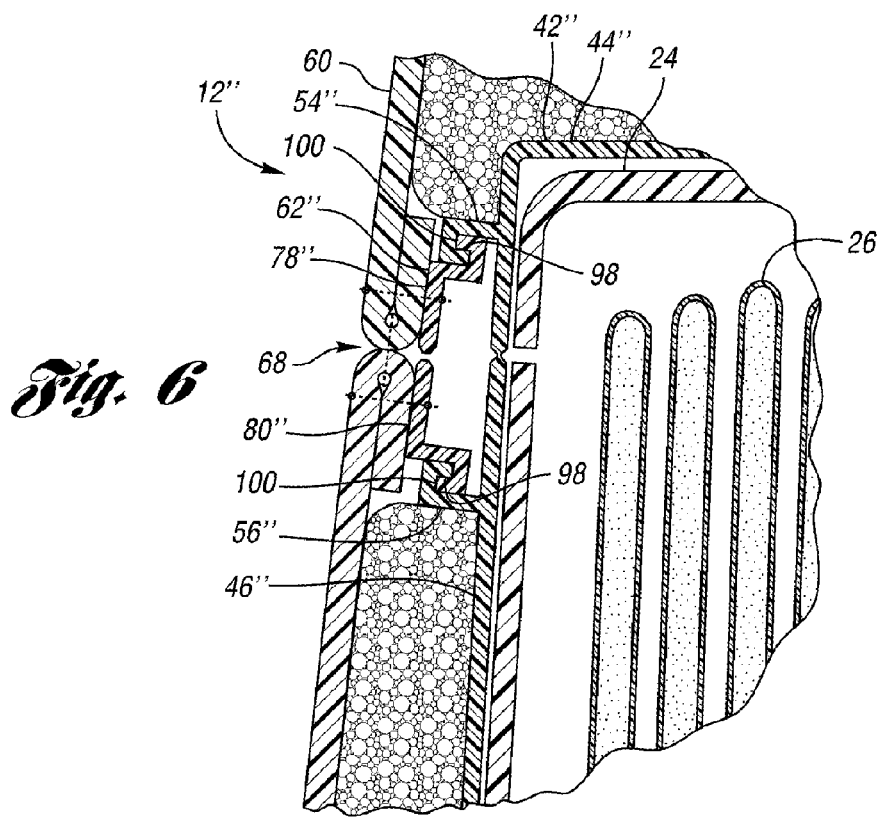

VEHICLE SEAT ASSEMBLY WITH AIR BAG GUIDE

BACKGROUND OF THE INVENTION

1. Field of the Invention

The invention relates to a vehicle seat assembly having an inflatable air bag.

2. Background Art

Vehicle seat assemblies may be provided with inflatable air bags. U.S. Pat. Nos. 6,045,151 and 6,237,934 disclose examples of such vehicle seat assemblies.

SUMMARY OF THE INVENTION

Under the invention, a vehicle seat assembly is provided. In one embodiment, the assembly includes an air bag arrangement including an inflatable air bag, and a guide disposed proximate the air bag arrangement for facilitating deployment of the air bag. The assembly further includes a seat cushion attached to the guide, and a cover material overlaying the seat cushion, the guide and the air bag arrangement, wherein the cover material includes first and second sections. A retainer is connected to the guide and the first and second sections of the cover material. Upon inflation of the air bag, portions of each of the guide and the retainer are configured to move away from each other to allow the air bag to deploy between the first and second sections of the cover material.

Further under the invention, a method of manufacturing a vehicle seat assembly is provided. The method may include the steps of attaching an air bag arrangement to a seat frame, the air bag arrangement including an inflatable air bag; positioning a seat pad arrangement over the air bag arrangement, the seat pad arrangement including a seat pad and a guide attached to the seat pad; positioning a cover arrangement over the air bag arrangement after the attaching step, the cover arrangement including a cover material having first and second sections, and a retainer connected to the first and second sections of the cover material; and connecting the retainer to the guide, such that upon inflation of the air bag, portions of each of the guide and the retainer are configured to move away from each other to allow the air bag to deploy between the first and second sections of the cover material.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a side view of a vehicle seat assembly according to the invention and including an air bag module positioned in a seat back cushion assembly;

FIG. 2 is a fragmentary cross-sectional view of the seat back cushion assembly taken along line 2-2 of FIG. 1 and showing a guide positioned adjacent the air bag module and connected to first and second sections of a cover material with a retainer;

FIG. 5 is an enlarged view similar to FIG. 3 of a second embodiment of the seat back cushion assembly;

FIG. 6 is an enlarged view similar to FIG. 3 of a third embodiment of the seat back cushion assembly.

DETAILED DESCRIPTION OF THE PREFERRED EMBODIMENT(S)

Figure 3:
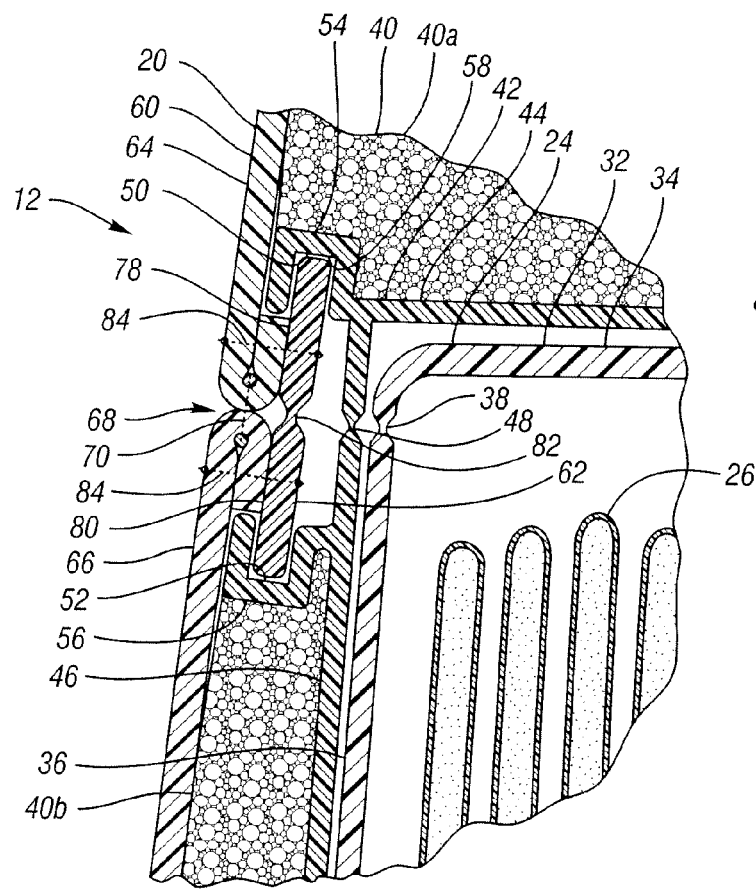
FIG. 3 is an enlarged view of a portion of FIG. 2 showing the connection between the guide and the cover material.

FIG. 1 shows a vehicle seat assembly 10 according to the invention for use in a motor vehicle. The seat assembly 10 includes a seat back cushion assembly 12 and a seat bottom cushion assembly 14 attached to the seat back cushion assembly 12. The seat back cushion assembly 12 includes an air bag arrangement or assembly, such as an air bag module 16, a seat pad arrangement 18 overlaying the air bag module 16, and a cover arrangement 20 overlaying the seat pad arrangement 18 and air bag module 16.

As shown in FIG. 2, the air bag module 16 may be disposed proximate one side of the seat back cushion assembly 12, such as an outboard lateral side or an inboard lateral side, and may be connected to a support member, such as seat back frame 22. Alternatively, the air bag module 16 may be located in any suitable position on the seat back cushion assembly 12 or seat bottom cushion assembly 14. Furthermore, the seat back cushion assembly 12 and seat bottom cushion assembly 14 may each be provided with multiple air bag modules 16, such as outboard and inboard air bag modules 16 that each have a similar configuration and function as described below in detail.

In the embodiment shown in FIG. 2, the air bag module 16 includes a housing 24 that may substantially surround an inflatable air bag 26, and an inflator 28 connected to the air bag 26 for inflating the air bag 26. The inflator 28 may be connected to the frame 22, or other suitable support member, in any suitable manner, such as with one or more fasteners 30. The fasteners 30, which may each include a bolt and nut for example, may also be used to connect the housing 24 to the frame 22. Alternatively, the air bag module 16 may be connected to the frame 22, or other suitable support member, in any suitable manner.

The housing 24 has a body 32, such as a clam-shell body, that may comprise a relatively rigid molded plastic material, such as polypropylene. Alternatively, the body 32 may be made of any suitable material and in any suitable manner. For example, the body 32 may comprise a flexible plastic material. Furthermore, the body 32 has first and second housing portions 34 and 36, respectively, that are moveable away from each other upon inflation of the air bag 26.

In the embodiment shown in FIGS. 2 and 3, the housing portions 34 and 36 are joined together by a rupturable portion or weakened area, such as a frangible groove or seam 38, that is configured to rupture upon inflation of the air bag 26. Alternatively, ends of the housing portions 34 and 36 may be spaced apart from each other to define a deployment opening. Furthermore, if desired, the housing portions 34 and 36 may joined together in any suitable manner, such as with one or more temporary or breakable fasteners.

As another alternative, the air bag module 16 may be provided without a housing. In one embodiment, for example, the air bag module 16 may include a soft cover, such as a fabric cover, that covers a portion or all of the air bag 26.

Referring to FIGS. 2 and 3, the seat pad arrangement 18 includes a seat cushion or pad 40 and a guide 42 attached to the seat pad 40. The seat pad 40 may define the general shape of the front portion of the seat back cushion assembly 12, and may be include one or more sections. In at least one embodiment, the seat pad 40 is made from a molded polymeric material, such as a polyurethane foam. The use of a polymeric foam material to construct the seat pad 40 can be cost effective and can provide the flexibility needed to easily change the shape of the seat pad 40 for different vehicle seat configurations. Alternatively, the seat pad 40 may comprise any suitable material, and may be made in any suitable manner.

The guide 42 is disposed adjacent the housing 24 and may function to inhibit the air bag 26 from contacting the seat pad 40 during deployment. Furthermore, the guide 42 may extend substantially the entire length of the housing 24, or along any portion of the length of the housing 24. In the embodiment shown in FIGS. 2 and 3, the guide 42 includes first and second guide portions 44 and 46, respectively, that are joined together by a frangible portion 48 that is configured to rupture or otherwise break upon deployment of the air bag 26. For example, the frangible portion 48 may include a reduced thickness area, as shown in FIGS. 2 and 3, and/or multiple perforations that result in a weakened area compared to the adjacent guide portions 44 and 46. As another example, the frangible portion 48 may be made of a weaker material relative to that of guide portions 44 and 46.

As further shown in FIG. 3, the first and second guide portions 44 and 46 may have first and second receptacles 50 and 52, respectively. In the embodiment shown in FIG. 3, the first and second receptacles 50 and 52, respectively, are defined by first and second projections 54 and 56, respectively. Furthermore, the receptacles 50 and 52 cooperate to define a longitudinally extending channel 58.

The guide 42 may comprise any suitable material and may be made in any suitable manner. For example, the guide 42 may be made of relatively rigid plastic, such as nylon, polypropylene, or polyethylene, that is molded or extruded into a desired shape. Furthermore, the guide 42 may be formed as a single piece, or as multiple pieces or portions that are connected together or spaced apart from each other.

In addition, the guide 42 may be attached to the seat pad 40 in any suitable manner. For example, first and second sections 40a and 40b, respectively, of the seat pad 40 may be glued to the first and second guide portions 44 and 46, respectively. As another example, the guide 42 may be attached to the seat pad 40 through an insert molding process. More specifically, the guide 42 may be positioned in a mold, and then foamable material may be introduced into the mold to form the seat pad 40 such that the seat pad 40 is bonded to the guide 42.

The cover arrangement 20 includes a cover material or trim cover 60 and a retainer 62 attached to the trim cover 60. The trim cover 60 may be made of any suitable material, such as cloth, vinyl or leather, and may be provided with or without a padding layer. Furthermore, the trim cover 60 may include multiple pieces that are joined together at seams.

Referring to FIGS. 2 and 3, the trim cover 60 includes first and second sections 64 and 66, respectively, that cooperate to define a seam 68 through which the air bag 26 may deploy. For example, the sections 64 and 66 may be connected together such as with sewn stitching 70, as shown in FIG. 3. Alternatively, ends of the first and second sections 64 and 66, respectively, may not be directly connected together, but merely abut each other to define the seam 68.

As is shown in FIGS. 1 and 2, in at least some embodiments, a relatively rigid panel 74 may also be provided in the rear area of the seat back cushion assembly 12 to provide support and/or for aesthetics. The panel 74 may include a main body 75, such as a plastic molding. In addition, the panel 74 may include a cover layer 76 made of any suitable material, such as cloth, leather or vinyl, attached to the main body 75.

Referring to FIG. 3, the retainer 62 includes first and second retainer portions 78 and 80, respectively, that are joined together by a frangible portion 82 that is configured to rupture or otherwise break upon deployment of the air bag 26. For example, the frangible portion 82 may include a reduced thickness area, as shown in FIGS. 2 and 3, and/or multiple perforations that result in a weakened area compared to the adjacent retainer portions 78 and 80. As another example, the frangible portion 82 may be made of a weaker material relative to that of retainer portions 78 and 80.

Furthermore, the first and second retainer portions 78 and 80, respectively, may be connected in any suitable manner to the first and second sections 64 and 66, respectively, of the trim cover 60. For example, the retainer portions 78 and 80 may be sewn, tacked, glued, or sonically welded to the sections 64 and 66. In the embodiment shown in FIG. 3, for example, the retainer portions 78 and 80 are sewn to the trim cover sections 64 and 66 with stitching 84.

The first and second retainer portions 64 and 66, respectively, are disposable in the first and second receptacles 50 and 52, respectively, to connect the trim cover 60 to the guide 42. In the embodiment shown in FIG. 3, for example, the retainer 62 is configured to be slid into the channel 58 defined by the receptacles 50 and 52.

Figure 4:
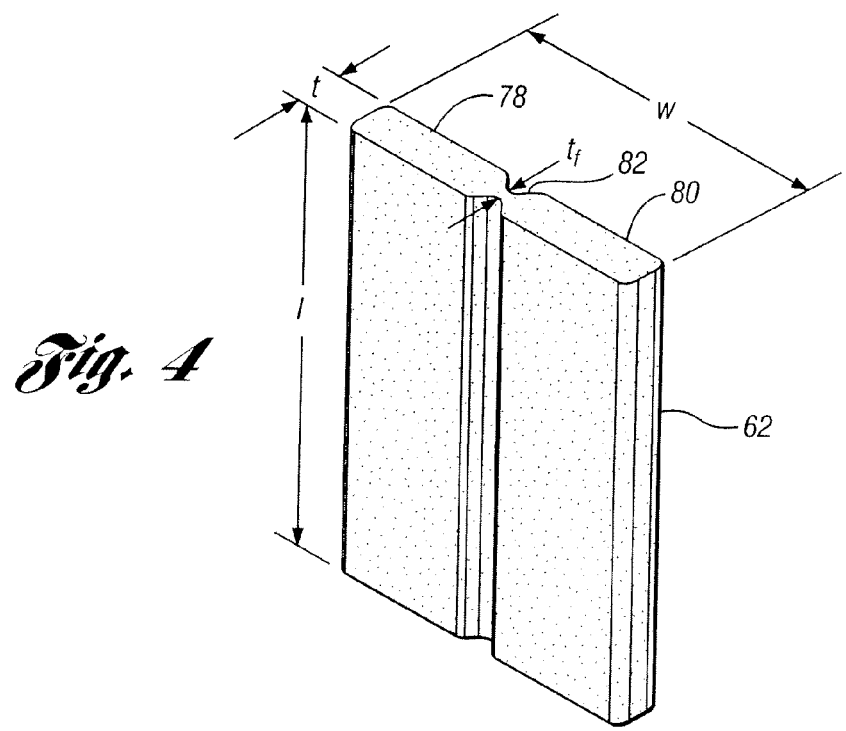
FIG. 4 is a perspective view of the retainer.

While the retainer 62 may have any suitable configuration, referring to the embodiment shown in FIG. 4, the retainer 62 may have a length/in the range of 25 to 500 millimeters (mm), and a width w in the range of 25 to 150 mm. Furthermore, the retainer portions 78 and 80 may each have a general thickness t in the range of 0.5 to 5 mm. In embodiments where the frangible portion 82 comprises a section having a reduced thickness relative to the retainer portions 78 and 80, the frangible portion 82 may have a minimum general thickness $t_f$ in the range of 0.05 to 0.4 mm.

The retainer 62 may comprise any suitable material and may be made in any suitable manner. For example, the retainer 62 may be made of relatively rigid plastic, such as nylon, polypropylene, or polyethylene, that is molded or extruded into a desired shape. Furthermore, the retainer 62 may be formed as a single piece or as multiple pieces.

With the configuration described above, the retainer 62 may extend substantially the entire length of the guide 42, which may extend substantially the entire length of the housing 24. Alternatively, the retainer 62 may extend along any portion of the length of the guide 42. Furthermore, multiple retainers that are the same or similar to the retainer 62 may be used to connect the trim cover 60 to the guide 42.

Referring to FIGS. 1 through 3, an exemplary method of assembling the vehicle seat assembly 10 will now be described. First, the air bag module 16 may be connected to the frame 22 with the fasteners 30. Next, the seat pad arrangement 18 may positioned about the air bag module 16 and frame 22, and attached to the air bag module 16 and/or frame 22, such that the first guide portion 44 is positioned adjacent the first housing portion 34 and the second guide portion 46 is positioned adjacent the second housing portion 36. The trim cover 60 with the retainer 62 already attached thereto may then be placed over the seat pad arrangement 18, and the retainer 62 may be slid in a longitudinal direction into the channel 58 of the guide 42. Next, a free end 86 of the trim cover section 66 may be connected to the frame 22 in any suitable manner, such as with a clip 88. The panel 74 may then be attached to the frame 22, or other suitable support member, in any suitable manner.

When the air bag 26 is inflated by the inflator 28, the air bag 26 causes the frangible seam 38 to break, and further causes the first and second housing portions 34 and 36, respectively, to move away from each other. Continued inflation of the air bag 26 causes the frangible portion 48 of the guide 42 and the frangible portion 82 of the retainer 62 to rupture, and also causes the seam 68 to rupture if the trim cover sections 64 and 66 are connected together at the seam 68. As a result, the air bag 26 is able to deploy between the sections 64 and 66 of the trim cover 60.

The guide 42 and/or retainer 62 may function to facilitate deployment of the air bag 26 in one or more ways. For example, use of the guide 42 and/or retainer 62 may ensure proper alignment between the air bag module 16 and the seam 68. As another example, the guide 42 may guide the air bag 26 toward the seam 68 during deployment. As yet another example, the guide 42 may inhibit or prevent contact between the air bag 26 and the seat pad 40 during deployment of the air bag 26. This can help to reduce energy loss from the air bag 26 by decreasing friction. This, in turn, can also help to reduce the deployment time for the air bag 26 and/or the amount of inflation fluid required to deploy the air bag 26. As still yet another example, the guide 42 and/or retainer 62 can each be manufactured to consistently provide a break strength for the respective frangible portion 48, 82 that is within a desired break strength range. As a result, use of the guide 42 and/or retainer 62 can help ensure relatively consistent air bag deployment. In that regard, if the trim cover sections 64 and 66 are directly connected together at seam 68, the break strength of such connection may be configured to be relatively small compared to the break strength of the frangible portion 48 and/or the frangible portion 82.

Figure 7:
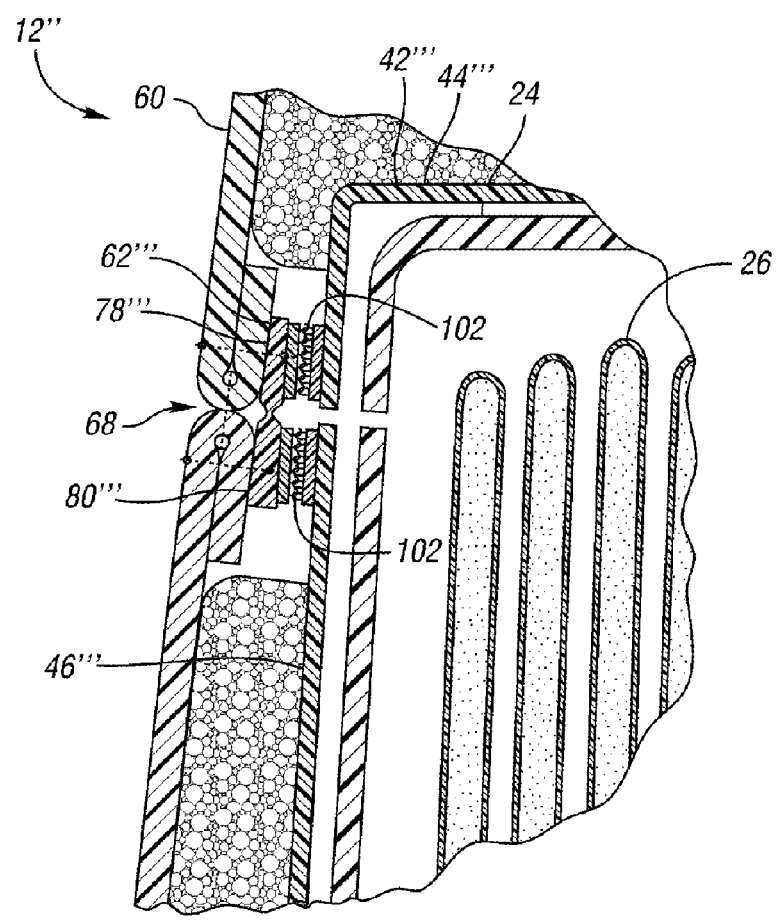
FIG. 7 is an enlarged view similar to FIG. 3 of a fourth embodiment of the seat back cushion assembly.

Referring to FIGS. 5-7, some example alternative guide and retainer configurations are shown for additional embodiments 12', 12" and 12'" of the seat back cushion assembly. In the embodiment 12' shown in FIG. 5, guide 42' includes first and second guide portions 44' and 46', respectively, that have ends 90 spaced apart from each other to define a deployment opening. Alternatively, ends 90 of the guide portions 44' and 46' may be connected together with a frangible portion, such as described above in detail. In addition, first and second projections 54' and 56', respectively, of the first and second guide portions 44' and 46', respectively, each have a beveled end 92.

Retainer 62' shown in FIG. 5 includes first and second retainer portions 78' and 80', respectively, that each have a leg 94 having a beveled end 96. The beveled ends 96 are engageable with the beveled ends 92 of the guide 42' to facilitate a snap-fit engagement between the retainer 62' and the guide 42'. The legs 94 may also function to space the trim cover 60 away from the guide 42' proximate the seam 68.

In the embodiment 12" shown in FIG. 6, guide 42" and retainer 62" are configured to provide an interlocking engagement between each other, such that retainer portions 78" and 80" may remain attached to the guide 42" during deployment of the air bag 26. More specifically, projections 54" and 56" of the guide 42" each define a groove 98 that is configured to slidably receive an end 100 of a respective retainer portion 78", 80". As shown in FIG. 6, the retainer portions 78" and 80" may be spaced away from each other prior to deployment of the air bag 26. Alternatively, the retainer portions 78" and 80" may be connected together with a frangible portion, such as described above in detail.

In the embodiment 12'" shown in FIG. 7, guide 42'" and retainer 62'" are connected together with hook and loop fasteners 102. Specifically, each guide portion 44'" and 46'" of guide 42'" includes one portion of a respective hook and loop fastener 102, and each retainer portion 78'" and 80'" includes the other portion of the respective hook and loop fastener 102.

Furthermore, as shown in FIG. 7, the guide portions 44'" and 46'" may be spaced apart from each other to define a deployment opening. Alternatively, the guide portions 44'" and 46'" may be connected together with a frangible portion, such as described above in detail.

While exemplary embodiments in accordance with the invention are illustrated and disclosed, such disclosure should not be construed to limit the claims. It is anticipated that various modifications and alternative designs may be made without departing from the scope of the invention. For example, a retainer according to the invention may be connected to a respective guide in any suitable manner. Furthermore, any of the features described above may be selectively combined with any of the above described embodiments.

What is claimed is:

1. A vehicle seat assembly comprising:
    an air bag arrangement including an inflatable air bag and a covering member that covers at least a portion of the air bag;
    a guide disposed proximate the air bag arrangement for facilitating deployment of the air bag, the guide being formed separately from the air bag arrangement and at least partially surrounding the covering member;
    a seat cushion attached to the guide;
    a cover material overlaying the seat cushion, the guide and the air bag arrangement, the cover material having first and second sections; and
    a retainer connected to the guide and the first and second sections of the cover material;
    wherein upon inflation of the air bag, portions of the guide are configured to allow relative movement therebetween and portions of the retainer are configured to allow relative movement therebetween to allow the air bag to deploy between the first and second sections of the cover material.

2. The assembly of claim 1 wherein the portions of the guide include first and second guide portions, and the guide further has a frangible portion that joins together the first and second guide portions, and wherein the frangible portion is configured to break upon inflation of the air bag to allow the first and second guide portions to move away from each other.

3. The assembly of claim 1 wherein the portions of the guide are spaced apart from each other prior to inflation of the air bag.

4. The assembly of claim 1 wherein the guide comprises rigid plastic material.

5. The assembly of claim 1 wherein the seat cushion is attached to the guide over a substantial portion of the guide.

6. The assembly of claim 1 wherein the guide includes first and second receptacles, and the retainer extends into the first and second receptacles.

7. The assembly of claim 1 wherein the retainer includes first and second legs that interlock with the guide.

8. The assembly of claim 1 wherein the retainer includes a frangible portion that is configured to break upon inflation of the air bag to allow the portions of the retainer to move away from each other.

9. The assembly of claim 1 wherein the portions of the retainer are spaced apart from each other prior to inflation of the air bag.

10. The assembly of claim 1 wherein the covering member comprises a housing that substantially surrounds the air bag, the housing being disposed adjacent to the guide.

11. The assembly of claim 1 wherein the first and second sections of the cover material are connected together at a seam through which the air bag is deployable, wherein the seam including the connected first and second sections of the cover material is disposed adjacent to the guide and air bag arrangement.

12. The assembly of claim 1 wherein the first and second sections of the cover material define a seam through which the air bag is deployable, and wherein the portions of the guide include first and second guide portions that each have an end disposed away from the seam, and the ends are spaced apart from each other.

13. A method of manufacturing a vehicle seat assembly, the method comprising:
attaching an air bag arrangement to a seat frame, the air bag arrangement including an inflatable air bag;
positioning a seat pad arrangement over the air bag arrangement, the seat pad arrangement including a seat pad and a guide attached to the seat pad;
positioning a cover arrangement over the air bag arrangement after the attaching step, the cover arrangement including a cover material having first and second sections, and a retainer connected to the first and second sections of the cover material; and
connecting the retainer to the guide, such that upon inflation of the air bag, portions of the guide are configured to allow relative movement therebetween and portions of the retainer are configured to allow relative movement therebetween to allow the air bag to deploy between the first and second sections of the cover material.

14. The method of claim 13 further comprising positioning the guide in a mold and introducing foamable material into the mold to form the seat pad such that the seat pad is bonded to the guide.

15. The method of claim 13 further comprising attaching the guide to the seat pad with an adhesive.

16. The method of claim 13 wherein the retainer has a frangible portion that is configured to break upon inflation of the air bag to allow the air bag to deploy between the first and second sections of the cover material.

17. The method of claim 13 wherein the guide has first and second receptacles, and wherein the connecting step includes inserting first and second ends of the retainer into the first and second receptacles, respectively.

18. The method of claim 13 wherein the guide defines a channel, and wherein the connecting step includes sliding the retainer along the channel to connect the retainer to the guide.

19. The method of claim 13 wherein the air bag arrangement includes a housing that houses the air bag, wherein the housing is disposed adjacent to the guide.

20. A vehicle seat assembly comprising:
an air bag arrangement including an inflatable air bag and a housing that covers the air bag;
a guide at least partially surrounding the housing of the air bag arrangement for facilitating deployment of the air bag;
a seat cushion attached to the guide;
a cover material overlaying the seat cushion, the guide and the air bag arrangement, the cover material having first and second sections; and
a retainer connected to the guide and the first and second sections of the cover material;
wherein upon inflation of the air bag, portions of the guide are configured to allow relative movement therebetween and portions of the retainer are configured to allow relative movement therebetween to allow the air bag to deploy between the first and second sections of the cover material.

* * * * *